United States Patent [19]

Scheuneman et al.

[11] Patent Number: 5,068,782

[45] Date of Patent: Nov. 26, 1991

[54] ACCESSING CONTROL WITH PREDETERMINED PRIORITY BASED ON A FEEDBACK ARRANGEMENT

[75] Inventors: James H. Scheuneman, St. Paul; Lawrence R. Fontaine, Minneapolis, both of Minn.

[73] Assignee: Unisys Corp., Detroit, Mich.

[21] Appl. No.: 418,911

[22] Filed: Oct. 5, 1989

Related U.S. Application Data

[63] Continuation of Ser. No. 9,985, Feb. 2, 1987, abandoned.

[51] Int. Cl.⁵ .................. G06F 13/18; G06F 12/02
[52] U.S. Cl. .................. 395/425; 364/246.12; 364/246.2; 364/251.7; 364/241.4; 364/242.8; 364/941.1; 364/960.7; 364/DIG. 1; 364/DIG. 2; 340/825.5
[58] Field of Search ... 364/200 MS File, 900 MS File; 340/825.5; 370/85.6

[56] References Cited

U.S. PATENT DOCUMENTS

| | | | |
|---|---|---|---|
| 4,516,199 | 5/1985 | Frieder et al. | 364/200 |
| 4,523,277 | 6/1985 | Schnathorst | 364/200 |
| 4,590,551 | 5/1986 | Mathews | 364/200 |
| 4,654,804 | 3/1987 | Thaden et al. | 364/520 |
| 4,663,756 | 5/1987 | Retterath | 370/85.6 |
| 4,691,289 | 9/1987 | Thaden et al. | 364/518 |
| 4,766,532 | 8/1988 | Pearson et al. | 364/200 |
| 4,953,081 | 8/1990 | Feal et al. | 364/200 |

*Primary Examiner*—Thomas C. Lee
*Assistant Examiner*—Ayni Mohamed
*Attorney, Agent, or Firm*—Nathan Cass; Mark T. Starr

[57] ABSTRACT

Accessing control means and methods are provided for controlling the granting of access by a plurality of requestors to a commonly shared unit on a predetermined priority basis. An addressable programmed memory, such as a ROM, is programmed to provide a predetermined access priority. The ROM operates in response to sequentially applied addresses to produce ROM outputs which determine the manner in which access is granted to the requestors. Each ROM output also includes history outputs which are fed back and combined with requestor signals to form each ROM address, whereby requestor access grating selection is determined based on previous access granting history as well as on current request status.

18 Claims, 3 Drawing Sheets

| HISTORY STATES | | BINARY TRIPLETT | | |
|---|---|---|---|---|
| LR | MR | H-1 | H-2 | H-3 |
| P-1 | P-3 | 0 | 0 | 0 |
| P-1 | P-2 | 0 | 0 | 1 |
| P-2 | P-3 | 0 | 1 | 0 |
| P-2 | P-1 | 0 | 1 | 1 |
| P-3 | P-1 | 1 | 0 | 0 |
| P-3 | P-2 | 1 | 0 | 1 |

| ADDRESS REG. INPUTS | | | | | | ROM OUTPUTS | | | | | |
|---|---|---|---|---|---|---|---|---|---|---|---|
| R-1 | R-2 | R-3 | H-1' | H-2' | H-3' | G-1 | G-2 | G-3 | H-1 | H-2 | H-3 |
| 1 | 0 | 0 | 0 | 0 | 0 | 1 | 0 | 0 | 0 | 1 | 1 |
| 1 | 0 | 0 | 0 | 0 | 1 | 1 | 0 | 0 | 1 | 0 | 0 |
| 1 | 0 | 0 | 0 | 1 | 0 | 1 | 0 | 0 | 0 | 1 | 1 |
| 1 | 0 | 0 | 0 | 1 | 1 | 1 | 0 | 0 | 0 | 1 | 1 |
| 1 | 0 | 0 | 1 | 0 | 0 | 1 | 0 | 0 | 1 | 0 | 0 |
| 1 | 0 | 0 | 1 | 0 | 1 | 1 | 0 | 0 | 1 | 0 | 0 |

Fig.5

| ADDRESS REG. INPUTS | | | | | | ROM OUTPUTS | | | | | |
|---|---|---|---|---|---|---|---|---|---|---|---|
| R-1 | R-2 | R-3 | H-1' | H-2' | H-3' | G-1 | G-2 | G-3 | H-1 | H-2 | H-3 |
| 1 | 0 | 1 | 0 | 0 | 0 | 1 | 0 | 0 | 0 | 1 | 1 |
| 1 | 0 | 1 | 0 | 0 | 1 | 1 | 0 | 0 | 1 | 0 | 0 |
| 1 | 0 | 1 | 0 | 1 | 0 | 1 | 0 | 0 | 0 | 1 | 1 |
| 1 | 0 | 1 | 0 | 1 | 1 | 0 | 0 | 1 | 0 | 1 | 0 |
| 1 | 0 | 1 | 1 | 0 | 0 | 0 | 0 | 1 | 0 | 1 | 0 |
| 1 | 0 | 1 | 1 | 0 | 1 | 0 | 0 | 1 | 0 | 0 | 0 |

Fig.6

| ADDRESS REG. INPUTS | | | | | | ROM OUTPUTS | | | | | |
|---|---|---|---|---|---|---|---|---|---|---|---|
| R-1 | R-2 | R-3 | H-1' | H-2' | H-3' | G-1 | G-2 | G-3 | H-1 | H-2 | H-3 |
| 1 | 1 | 1 | 0 | 0 | 0 | 1 | 0 | 0 | 0 | 1 | 1 |
| 1 | 1 | 1 | 0 | 0 | 1 | 1 | 0 | 0 | 1 | 0 | 0 |
| 1 | 1 | 1 | 0 | 1 | 0 | 0 | 1 | 0 | 0 | 0 | 1 |
| 1 | 1 | 1 | 0 | 1 | 1 | 0 | 1 | 0 | 1 | 0 | 1 |
| 1 | 1 | 1 | 1 | 0 | 0 | 0 | 0 | 1 | 0 | 1 | 0 |
| 1 | 1 | 1 | 1 | 0 | 1 | 0 | 0 | 1 | 0 | 0 | 0 |

Fig.7

| CYC | ADDRESS REG. INPUTS | | | | | | ROM OUTPUTS | | | | | |
|---|---|---|---|---|---|---|---|---|---|---|---|---|
| | R-1 | R-2 | R-3 | H-1' | H-2' | H-3' | G-1 | G-2 | G-3 | H-1 | H-2 | H-3 |
| C1 | 1 | 1 | 1 | 0 | 1 | 1 | 0 | 1 | 0 | 1 | 0 | 1 |
| C2 | 1 | 0 | 1 | 1 | 0 | 1 | 0 | 0 | 1 | 0 | 0 | 0 |
| C3 | 1 | 0 | 0 | 0 | 0 | 0 | 1 | 0 | 0 | 0 | 1 | 1 |

ACCESSING CONTROL WITH PREDETERMINED PRIORITY BASED ON A FEEDBACK ARRANGEMENT

This application is a continuation of application Ser. No. 009,985, filed Feb. 2, 1987, now abandoned.

BACKGROUND OF THE INVENTION

This invention relates generally to data processing control apparatus, and more particularly to improved accessing control means and methods for providing access, in accordance with a predetermined priority basis, for a plurality of requestors to a commonly shared unit, channel or service. For example, the requestors may comprise a plurality of data processing ports, the commonly shared unit may be a memory storage unit, and the priority may be on a random selection basis, that is, requests are granted on a first-come, first-serve basis.

A typical prior art three-port priority system is illustrated in FIG. 1 a plurality of ports P-1, P-2 and P-3 provide r request signals R-1, R-2 and R-3 to priority logic circuitry 10 which determines which one of the ports P-1, P-2 or P-3 is to be granted access to the commonly used unit by activating a corresponding one of the grant outputs G-1, G-2 or G-3.

If only one of the request signals R-1 to R-3 in the prior art system of FIG. 1 is active, the priority logic circuitry 10 simply grants access to the respective one of the ports P-1 to P-3 corresponding thereto. However, if more than one of the request signals R-1 to R-3 is active at the same time, the priority logic circuitry 10 must determine which of the corresponding ports P-1 to P-3 is to be granted access.

There are various possible ways known in the art for designing the priority logic circuitry 10 in FIG. 1 depending on the desired priorities, if any, which are to be given to the ports P-1, P-2 and P-3. However, known approaches to the design of such priority logic circuitry have been relatively complex and/or expensive.

SUMMARY OF THE INVENTION

In a preferred embodiment of the present invention, an improved priority logic circuit design is provided which is not only relatively simple and highly efficient, but which also permits the priority provided thereby to be easily changed.

More particularly, in a preferred embodiment of the invention, a programmed random access memory (which, for example, may be a read-only memory (ROM)) is operated in a feedback arrangement such that a desired predetermined priority logic is provided for the request ports which grants access based on the previous access granting history as well as on the current request status.

The specific nature of the invention as well as its objects, advantages, features and uses will become aparent from the following detailed description taken in conjunction with the accompanying drawings.

BRIEF DESCRIPTION OF THE DRAWINGS

FIG. 1 is a blocl diagram illustrating a prior art three-port priority selection system.

FIGS. 3-7 are tables illustrating the operation of the preferred embodiment of FIG. 2.

DETAILED DESCRIPTION OF A PREFERRED EMBODIMENT

Like numerals and characters refer to like elements throughout the figures of the drawings.

Figure 2:
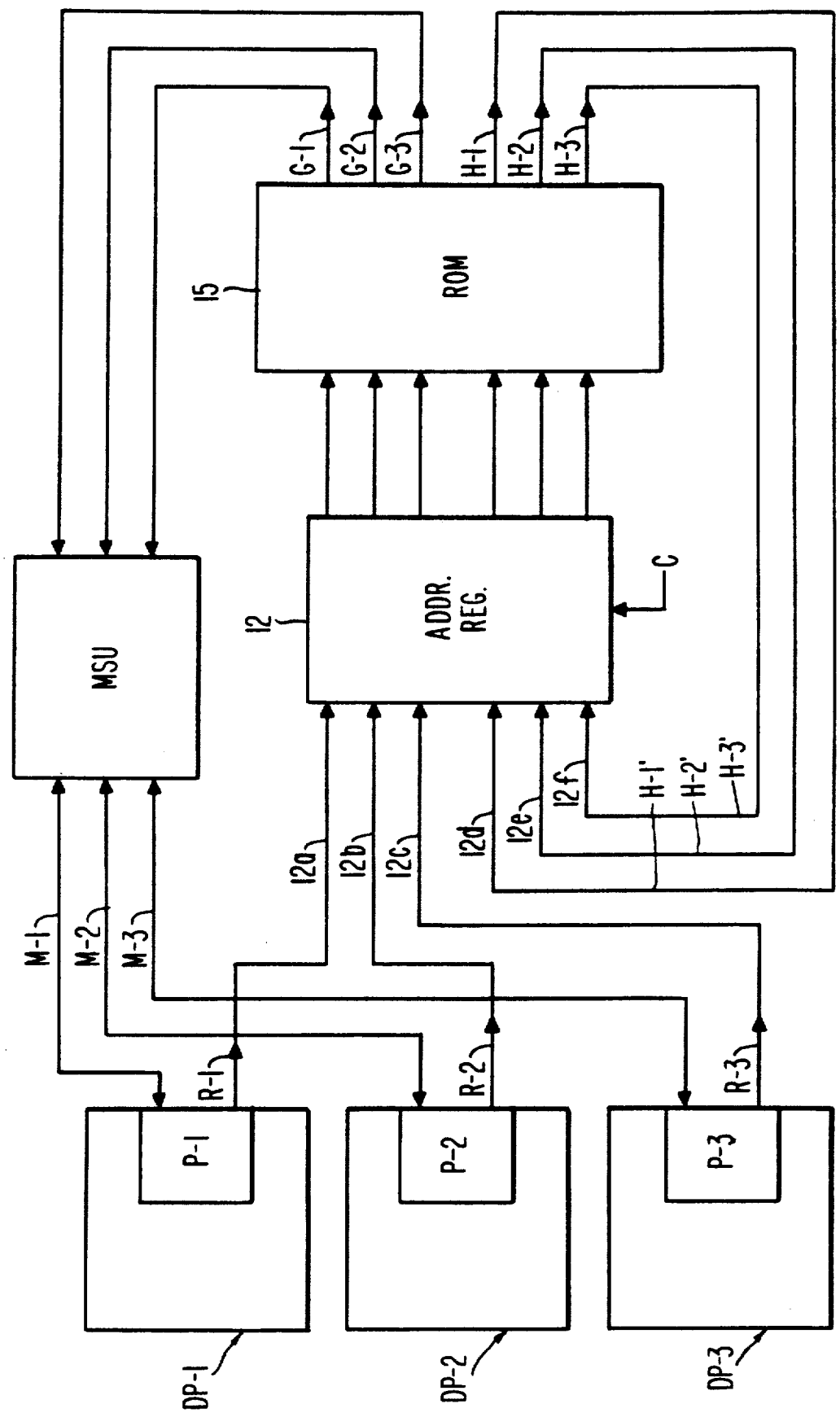
FIG. 2 is a block diagram illustrating a preferred embodiment of a priority selection system in accordance with the invention.

Reference is initially directed to FIG. 2 which illustrates a preferred embodiment of a three-port priority selection system in accordance with the invention.

As shown in FIG. 2, three data processors DP-1, DP-2 and DP-3 have respective output ports P-1, P-2 and P-3 which communicate with a memory storage unit MSU in a conventional manner via respective lines M-1, M-2, and M-3. Ports P-1, P-2 and P-3 also provide respective request lines R-1, R-2 and R-3 which are applied to respective inputs $12a$, $12b$ and $12c$ of an address register 12 of a programmed memory 15. In the preferred embodiment, programmed memory 15 is a read-only memory (ROM). The other address register inputs $12d$, $12e$ and $12f$ are derived by feeding back thereto ROM outputs H-1, H-2 and H-3, respectively, produced in response to the previous address contained in the address register 12. For reasons which will become evident leater on in this description, these ROM outputs H-1, H-2 and H-3 will be designated as history outputs. ROM 15 also provides grant signal outputs G-1, G-2 and G-3 in response to each applied address which are applied to the MSU. These grant signal outputs G-1, G-2 and G-3 indicate to the MSU which of the respective lines M-1, M-2 or M-3 of respective ports P-1, P2 and P-3 is next to be granted access to the MSU for communicating data therebetween.

For the purposes of this description, it will be assumed that a "1" signal value for a request signal R-1, R-2 or R-3 indicates that its respective port P-1, P-2 or P-3 is currently requesting access to the MSU, and that a "0" signal value indicates that its respective port is not currently requesting access to the MSU. Likewise, it will be assumed that a "1" signal value for a grant signal G-1, G-2 or G-3 indicates that its respective port P-1, P-2 or P-3 has been selected as the one which is next to be granted access to the MSU, while a "0" signal value indicates that its respective port has not been selected for the next access. The ROM history outputs H-1, H-2 and H-3 (which are fed back to the address register 12 to become address register inputs $12d$, $12e$ and $12f$) will also be designated as "1" and "0".

The preferred embodiment illustrated in FIG. 2 may, for example, operate cyclically in response to clocks C applied to the address register 12. Accordingly, at each clock, the values of the address register inputs $12a$, $12b$, $12c$, $12d$, $12e$ and $12f$ are stored in the address register 12, causing the ROM 15 to be addressed in accordance therewith. In the preferred embodiment, the response time of the ROM 15 and the clock frequency are such that the resulting ROM outputs G-1, G-2, G-3, H-1, H-2 and H-3 are produced prior to the occurrence of the next block. Also, operation is such that, when a port is selected for access as a result of ROM 15 producing a "1" for its corresponding grant signal G-1, G-2 or G-3, the corresponding port request signal R-1, R-2 or R-3 is caused to be switched to "0" (for example, in response to a signal communicated via the respective lines M-1, M-2 or M-3) before the occurrence of the next clock. Thus, at each clock, an updated ROM address is available at the inputs of the ROM address register 12 comprised of the current state of the requests R-1, R-2 and R-3 and the ROM history outputs H-1, H-2 and H-3 produced in response to the immediately previous address. It is to be understood that other timing arrangements may also be employed within the scope of the invention.

From the foregoing description, it will be evident that the resulting values produced for the ROM outputs G-1, G-2, G-3 and H-1, H-2 and H-3 in response to the address inputs 12a, 12b, 12c, 12d, 12e and 12f are determined by the particular programming provided for the ROM 15. It will be understood that this ROM programming can readily be designed by those skilled in the art to provide a desired logical relationship between the input address and the ROM outputs. It will also be understood that this programming can be made easily changeable, either by using a programmable ROM (such as an EPROM) or by using a random access memory (RAM). Also, the ROM programming can be made changeable by using a plug-in type of ROM, in which case the ROM Programming can be changed by plugging in a ROM having different programming.

It will next be explained how the preferred embodiment of FIG. 2 is advantageously able to provide for access, on a desired predetermined priority basis, for the ports P-1, P-2, P-3 in the embodiment of FIG. 2. For this purpose, a specific example will be presented for which it will be assumed that the predetermined priority desired is a random port selection, that is, a priority selection such that the ports P-1, P-2 and P-3 are granted access on a first-come, first-served basis.

Figures 1, 3, 4:
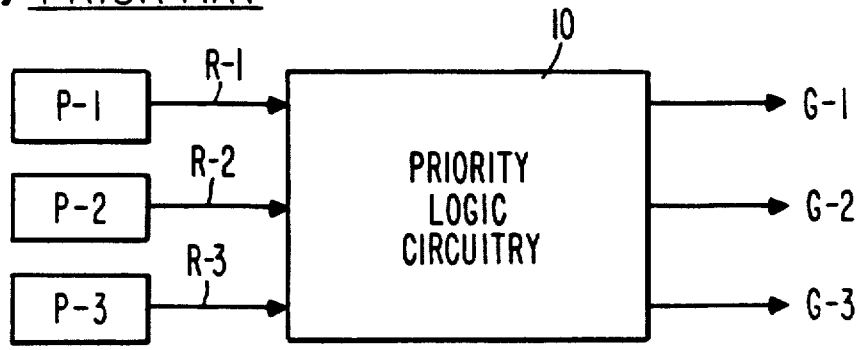

FIG. 3 is a history table which designates a unique binary triplet value (corresponding to the ROM history outputs H-1, H-2 and H-3 in FIG. 2) for each of the six possible history states that can occur for a three-port selection system. These six possible history states are represented in FIG. 3 by indicating which ports are the least recently (LR) and most recently (MR) accessed for each history state. For example, it will be seen that the binary triplet 000 designates a history state such that P-1 is the least recently accessed port and P-3 is the most recently accessed port. As another example, the binary triplet 011 designates a history state such that P-2 is the least recently accessed port and P-1 is the most recently accessed port. For greater clarity in the remaining description, these history signals will be designated as H-1, H-2, H-3 when viewed as ROM outputs, and by H-1', H-2', H-3' when viewed as ROM inputs.

FIGS. 4, 5 and 6 are truth tables which show the binary values of the ROM grant outputs G-1, G-2, G-3 and history outputs H-1, H-2, H-3 produced by ROM 15 in the embodiment of FIG. 2 for particular exemplary values of the request signals R-1, R-2, R-3 and the history inputs H-1', H-2', H-3' (which constitute the address register inputs 12a, 12b, 12c, 12d, 12e, 12f at the beginning of each cycle). More specifically, FIG. 4 is a truth table for the situation where only request signal R-1 is requesting access at the beginning of a cycle, FIG. 5 is a truth table illustrating the situation where two of the request signals R-1 and R-3 are concurrently requesting access at the beginning of a cycle, and FIG. 6 is a truth table illustrating the situation where all of the three request signals R-1, R-2, R-3 are concurrently requesting access at the beginning of a cycle. From these exemplary truth tables, those skilled in the art will readily be able to derive the truth tables for the remaining address register input possibilities as well as the ROM programming required for their implementation.

Now considering the truth tables of FIGS. 4–6 in more detail, it will be seen that the left side of each truth table (designated as ADDRESS REGISTER INPUTS) sets forth the binary values for various possible addresses which may occur in terms of the request signals R-1, R-2, R-3 and history inputs H-1', H-2', H-3'. The right side of each truth table (designated as ROM OUTPUTS) sets forth the resulting binary values of the ROM outputs in terms of the history outputs H-1, H-2, H-3 and grant outputs G-1, G-2, G-3. In particular, note that the various address history inputs H-1', H-2', H-3' chosen for each of the truth tables of FIGS. 4–6 are the binary triplet history values set forth in FIG. 3 for the various possible LR and MR states of the ports P-1, P-2 and P-3. Also note that each truth table is directed to a particular request state, as indicated by use of the same request values for R-1, R-2, R-3 throughout the table.

From the foregoing, it will be evident that each of the truth tables of FIGS. 4–6 sets forth the various ROM outputs (H-1, H-2, H-3, G-1, G-2, G-3) produced for a particular request state (R-1, R-2, R-3) for all of the possible history input states H-1', H-2', H-3' set forth in FIG. 3. Accordingly, it will be understood that the truth table of FIG. 4 sets forth the ROM output values which will be produced for each possible history input state when the input request state is R-1 R-2 R-3=100 (corresponding to the situation where only port P-1 is requesting access), the truth table of FIG. 5 sets forth the ROM output values which will be produced for each possible history input state when the input request state is R-1 R-2 R-3=101 (corresponding to the situation where ports P-1 and P-3 are concurrently requesting access), and FIG. 6 sets forth the ROM output values which will be produced for each possible history input state when the input request state is R-1 R-2 R-3=111 (corresponding to the situation where all three ports P-1, P-2 and P-3 are concurrently requesting access).

As an example, attention is directed to the first entry in the table of FIG. 4. This entry shows that, for the situation where only port P-1 is requesting access (R-1 R-2 R-3=100), and where P-1 is the least recently and P-3 the most recently accessed port (H-1' H-2' H-3'=000) the resulting ROM grant outputs will be G-1 G-2 G-3=100 (indicating that port P-1 is to next be granted access) and the resulting history outputs will be H-1 H-2 H-3=011 (indicating that P-2 is now the least recently accessed port and P-1 the most recently accessed ports. The granting of the next access to port P-1 is, of course, to be expected since only port P-1 was requesting access in this example.

As another example, attention is directed to the next to last line in the table of FIG. 5 corresponding to the situation where ports P-1 and P-3 are concurrently requesting access (R-1 R-2 R-3=101), and port P-3 is the least recently and P-1 the most recently accessed port (H-1' H-2' H-3'=100). For this example, it will be seen that the resulting ROM grant outputs will be G-1 G-2 G-3=001 (indicating that port P-3 is to be next granted access) and the resulting history outputs will be H-1 H-2 H-3=010 (indicating that port P-2 is now the least recently accesses port and port P-3 is now the most recently accessed port).

As a final example, the operation of the preferred embodiment of FIG. 3 will be described for the particular plurality of cycles C1 to C3 illustrated in FIG. 7 which illustrates operation for the situation where all three ports P-1, P-2 and P-3 concurrently request access.

As shown in FIG. 7, cycle C1 illustrates the situation for which the request address inputs are R-1 R-2 R-

3=111 (indicating that all three ports P-1, P-2, P-3 are currently requesting access) and the history address inputs are H-1, H-2' H-3, =011 (indicating that P-2 is currently the least recently accessed port and P-1 the most recently accessed port). This condition corresponds to the fourth line in the truth table of FIG. 6. Accordingly, as shown in FIG. 7, the resulting ROM grant outputs for cycle C1 are G-1 G-2 G-3=010 (indicating that port P-2 will next be granted access) and the resulting ROM history outputs are H-1 H-2 H-3=101 (which as shown in FIG. 3 indicates that P-3 is now the least recently accessed port and P-2 is the most recently accessed port).

For the next cyce C2 illustrated in FIG. 7, it will be seen that the request address inputs are now R-1 R-2 R-3=101 as a result of R-2 having been changed to "0" in response to port P-2 having been granted access during cycle C1. The hstory address inputs for C2 are now H-1' H-2' H-3'=101 as a result of their being derived from the ROM history outputs H-1 H-2 H-3=101 produced during cycle C1. This condition during C2 corresponds to the last line in the truth table of FIG. 5. Accordingly, as shown for C2 in FIG. 7 the resulting ROM grant outputs are G-1 G-2 G-3=001 (indicating that port G-3 will next be granted access) and the resulting ROM history outputs are H-1 H-2 H-3=000 (which as shown in FIG. 3 indicates that port P-1 is the least recently accessed port and port P-3 is the most recently accessed port).

Thus, as shown in FIG. 7, for the last cycle C3 of this example, the request address inputs are R-1 R-2 R-3=100 and the history address inputs are H-1' H-2' H-3'=000. In accordance with the next to last line in the truth table of FIG. 5, the resulting ROM outputs produced during C3 are thus G-1 G-2 G-3=100 (indicating that port P-1 will next be granted access and H-1 H-2 H-3=011 indicating that P-2 is the least recently accessed port and P-1 is the most recently accessed port).

Although the description herein has been directed to a particular preferred embodiment of the invention, it is to be understood that many modifications and variations can be made in construction, arrangement, operation and/or use of the invention without departing from the scope and spirit of the invention. For example, although the particular preferred embodiment described above is directed to providing random port selection, it will be evident that the ROM can be programmed to provide other types of priority selection. It will also be evident that the invention can be applied to additional numbers of requestors.

Accordingly, the present invention is to be considered as including all possible modifications and variations coming within the scope of the appended claims.

We claim:

1. Accessing control means for use in selecting the manner in which a plurality of requestors are to be granted access to a commonly shared means, said accessing control means comprising;

means providing respective request signals for said requestors, each request signal indicating whether access is currently being requested by its respective requestor;

an addressable programmed memory for producing a memory output dependent upon an applied address and the programming of said memory, said memory output comprising first and second memory output portions, said first memory output portion being indicative of a future access granting selection for said requestors and said second memory output portion being indicative of the recency of previous granting selections provided for said requestors;

means responsive to said first memory output portion for granting access to the requestor indicated thereby; and addressing means for sequentially applying addresses to said memory, each address being comprised of first and second address portions, said first address portion being derived from said request signals so as to be indicative of which one or more of said requestors is requesing access and said second address portion being indicative of previous granting selections provided for said requestors, said second address portion being derived by feeding ack to said addressing means a previously produced second memory output portion;

and means responsive to said first memory output portion for granting access to the requestor indicated thereby.

2. The invention in accordance with claim 1, wherein said memory is programmed to provide a predetermined priority basis for granting access to said requestors.

3. The invention in accordance with claim 2, wherein said predetermined priority basis is a first-come, first-served basis.

4. The invention in accordance with claim 1, wherein said programmed memory is a ROM.

5. The invention in accordance with claim 1, wherein the programming of said memory is changeable.

6. The invention in accordance with claim 1, wherein said programmed memory is a random access memory.

7. The invention in accordance with claim 1, including means responsive to said first memory output portion for granting access to said requestors.

8. The invention in accordance with claim 1, wherein said second memory output portion includes history signals indicating requestor access granting history, said history signals indicating which requestor was least recently granted access, and wherein the second portion of said address is derived from said history signals.

9. The invention in accordance with claim 8, wherein said second memory output portion also indicates which requestor was most recently granted access.

10. A method of controlling the granting of access by a plurality of at least three requestors to a commonly shared means on a predetermined priority basis, said method comprising:

providing a respective request signal for each requestor which requests access to said commonly shared means;

providing an addressable random access memory programmed such that its memory output in response to an applied address comprises a history memory output portion which is indicative of the recency of past requestor access grants and a grant selection memory output portion which is indicative of a next requestor access grant said history memory output portion indicating the least recently accessed requestor and the most recently accessed requestor;

sequentially applying addresses to said memory wherein said addresses are derived from the request signals provided by said requestors and from said history memory output portion, each address being comprised of a first address portion derived from request signals provided by said requestors and a second address portion derived by feeding back said history memory output portion; and granting access to said requestors in response to said grant selection memory output portions produced by said sequentially applying.

11. The invention in accordance with claim 10, wherein said addressable random access memory is a ROM.

12. The invention in accordance with claim 10, wherein said predetermined priority basis is a first-come, first-served basis.

13. The invention in accordance with claim 10, wherein said history memory output portion and said grant selection memory output portion are concurrently produced in response to said sequentially applying.

14. Accessing control means for use in selecting the order in which a plurality of requestors are to be granted access to a commonly shared means, said accessing control means comprising:

an address register for receiving an address;

a programmed memory responsive to said address in said address register for producing a memory output;

said memory being programmed such that said memory output comprsies a first memory output portion indicative of a next access granting selection for said requestors and a concurrently produced second memory output portion indicative of previously provided granting selections for said requestors; and addressing means for sequentially storing addresses in said address register, each address comprising a first address portion indicative of which of said requestors is requesting access and a second address portion indicative of previous granting selections provided for said requestors;

said addressing means being operable to provide said second address portion concurrently with said first address portion by feeding back to said address register at least a portion of a previously produced second memory output portion.

15. The invention in accordance with claim 14, wherein said control means operates cyclically in response to applied clock signals such that, during each cycle, a new address comprised of said first and second address portions is stored in said address register in response to said request signals and said memory output portion produced during the previous cycle, and wherein during each cycle an access grant is made to a requestor in response to said first output memory portion.

16. In a data processing system, the combination comprising:

a commonly shared means;

a plurality of requestors, each requestor providing a request signal indicating that it is requesting access to said commonly shared means;

an address register for receiving an address;

a programmed memory responsive to an address in said address register for producing a memory output in response to said address and the programming of said memory, said memory output comprising a first memory output portion and a second memory output portion;

addressing means for sequentially applying addresses to said address register, each address being comprised of a first address portion and a second address portion, said first address portion being derived from said request signals so as to be indicative of which one or more of said requestors is requesting access to said commonly shared means, and said second address portion being derived from said second memory output portion;

said memory being programmed so that said first memory output portion is indicative of a next access granting selection for said requestors and said second memory output portion is indicative of previous access grants provided for said requestors, said second memory output portion indicating which requestor was least recently granted access; and means responsive to said first memory output portion for granting access to the requestor indicated thereby.

17. The invention in accordance with claim 16, wherein said second memory output portion also indicates which requestor was most recently granted access.

18. The invention in accordance with claim 16, wherein said system operates cyclically in response to applied clock signals such that, during each cycle, a new address comprised of said first and second address portions is stored in said address register in response to said request signals and said memory output portion produced during the previous cycle, and wherein during each cycle an access grant is made to a requestor in response to said first output memory portion.

* * * * *